United States Patent [19]

Petuchowski et al.

[11] Patent Number: 4,644,556
[45] Date of Patent: Feb. 17, 1987

[54] EXTENDED LASER SENSOR

[75] Inventors: Samuel J. Petuchowski, Bethesda, Md.; Thomas G. Giallorenzi, Springfield, Va.

[73] Assignee: The United States of America as represented by the Secretary of the Navy, Washington, D.C.

[21] Appl. No.: 573,752

[22] Filed: Jan. 25, 1984

[51] Int. Cl.$^4$ .............................................. H01S 3/082
[52] U.S. Cl. ........................................ 372/97; 372/92; 372/19; 372/28; 372/37; 372/6; 372/93; 372/107; 372/108; 350/96.29
[58] Field of Search ....................... 372/18, 19, 92, 28, 372/26, 33, 37, 6, 43, 93, 97, 107, 108; 350/96.29

[56] References Cited

U.S. PATENT DOCUMENTS

| | | |
|---|---|---|
| 3,696,310 | 10/1972 | Paoli et al. |
| 3,733,129 | 5/1973 | Bridges |
| 4,314,210 | 2/1982 | Everett |
| 4,319,186 | 3/1982 | Kingsley ............................. 350/96.29 |
| 4,433,291 | 2/1984 | Yariv et al. ......................... 350/96.29 |
| 4,474,427 | 10/1984 | Hill et al. ........................... 350/96.29 |
| 4,503,541 | 3/1985 | Weller et al. ........................... 372/32 |

OTHER PUBLICATIONS

Dandridge et al; "Diode Laser Sensor"; Electronics Lett., vol. 16, No. 25, 4 Dec. 1980, p. 948.
Dandridge et al; "Optical Fibre Magnetic Field Sensors"; Elect. Lett., vol. 16, No. 11, 22 May 1980, p. 408.
Jackson et al; "Measurements of Small Phase Shafts Using Single-Mode Optical-Fiber Interferometer"; Opt. Lett., vol. 5, No. 4, Apr. 1980, p. 139.
Mitsuhashi et al; "Voltage Change Across the Self Coupled Semiconductor Laser"; IEEE JQE, vol-QE-17, No. 7, Jul. 1981, p. 1216.
Smith, "Stabilized, Single-Frequency Output from a Long Laser Cavity", IEEE Journal of Quantum Electronics, QE-1, pp. 343-348, 1968.
Petuchowski et al., "Phase Sensitivity and Linewidth Narrowing in a Fox-Smith Configured Semiconductor Laser", Appl. Phys. Lett. 40(4), 15 Feb. 82.

Primary Examiner—Leon Scott, Jr.
Attorney, Agent, or Firm—Sol Sheinbein; Andrew M. Lesniak

[57] ABSTRACT

An extended laser sensor including a laser with an opticla gain lasing medium optically coupled to an optical resonant cavity including reference and sensor arms. Optical path length variations in the sensor arm induced by an incident physical field modulate the operating parameters of the laser. The field is sensed by monitoring these modulated operating parameters.

10 Claims, 4 Drawing Figures

EXTENDED LASER SENSOR

BACKGROUND OF THE INVENTION

1. Field of the Invention

The invention relates generally to optical sensors and more particularly to optical sensors utilizing lasers and optical fibers.

2. Description of the Prior Art

The development of optical sensors to detect physical fields is being actively pursued in laboratories throughout the world. These sensors can be orders of magnitude more sensitive than the electronic devices they are replacing and have other advantages related to deployment flexibility. One particularly promising type of sensor is the laser sensor.

The laser sensor utilizes the well-known effect that an external feedback mechanism may be utilized to modify the operating characteristics of a laser. For example, Dandridge et al. in an article entitled "Diode Laser Sensor", Elec. Letters., Vol. 16, 1980, pp. 948–9, disclose a laser-sensor with a fixed-reflectivity mirror mounted externally to a laser cavity. This mirror feeds a portion of the laser light output back into the cavity. The fixed-current laser output power is found to vary with the displacement of the mirror along the optical axis. If the mirror is mounted so that its displacement is modulated by a physical field then the parameters of the field may be measured by monitoring the output power of the laser.

The primary disadvantage of the above-described sensor is that it only senses the physical field over a small region of the field. Thus, the laser-sensor is essentially a point sensor.

Sensors for sensing the physical field over an extended region of space have been realized utilizing optical fibers. Typically these fiber-optic sensors include a laser-source a length of optical fiber, and a photodetector. The fiber may be very long to facilitate sensing the physical field over an extended region of space. Additionally, the fiber may be configured to allow spatial shading and directional sensing. For sensitive operation, the phase of the laser light propagating through the fiber must be accurately measured and this is typically accomplished by configuring the fiber as a Mach-Zehnder interferometer. These fiber optic Mach-Zehnder interferometers are complicated structures, however, requiring two precision fiber-optic beamsplitters and precise matching of reference and sensing arm lengths. Additionally, the sensitivity is degraded by noise inherent in the laser beam. The complexity of this arrangement is also increased by the photodetectors required to monitor the intensity of the output beams.

OBJECTS OF THE INVENTION

Accordingly, it is an object of the present invention to extend the region of a physical field sensed by a laser sensor.

It is a further object of the present invention to reduce the complexity of existing extended sensors utilizing optical fibers.

It is still a further object of the present invention to reduce the degradation of the performance of extended sensors due to noise inherent in the laser beam.

SUMMARY OF THE INVENTION

The above, and other, objects of the invention are achieved in the present invention which is an extended laser sensor. The sensor includes a laser with an optical gain medium for supporting a plurality of lasing modes, an optical resonant cavity for supporting a plurality of resonant modes, and with an optical device for optically coupling the gain medium and the resonant cavity. The response curve of the resonant cavity has peaks at the frequencies of the resonant modes and has low amplitude at other frequencies. Thus, the field in the resonant cavity that is coupled back into the gain medium has significant amplitude only at the resonant frequencies. Therefore, only those lasing modes at frequencies near a resonant mode will be excited. The sensor also includes a structure for varying the resonant frequencies of the resonant cavity in response to an external physical field. This variation of resonant frequency also varies the output parameters of the laser in response to the field. The field is sensed by monitoring the output parameters of the laser.

In one embodiment, the resonant cavity includes an optical fiber for sensing the field. The length of the this sensing fiber may be selected to sense the field over an extended region. Additionally, the fiber may be disposed to make field directionality measurements.

The present invention is structurally simpler than conventional extended sensors utilizing fiber-optic interferometers since only one coupler is utilized and there are no length-matching requirements. Also, the coupling between the lasing medium and resonant cavity causes the laser to operate in a low-noise, single-mode state. Thus, degradation of performance due to noise limitations is reduced.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The present invention is an extended laser sensor utilizing a fiber-optic resonant cavity to vary the operating parameters of a laser in response to an incident physical field.

Figure 1:
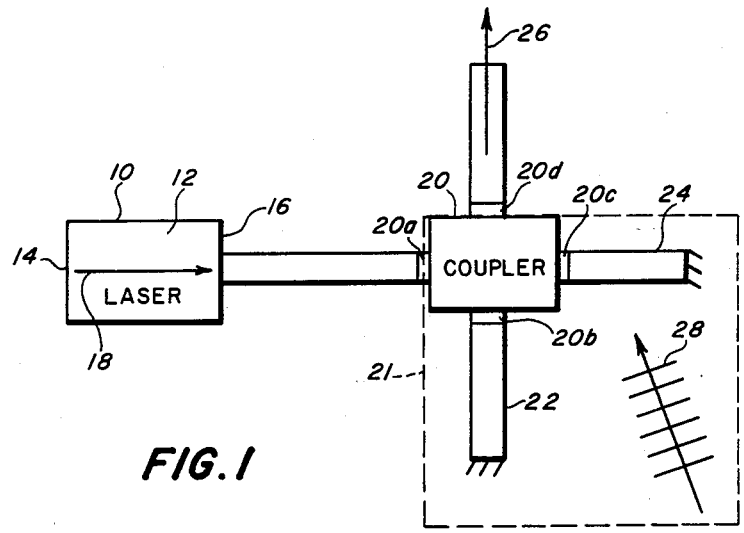
FIG. 1 is a block diagram of the invention.

Referring now to the drawings, wherein like reference numerals designate identical or corresponding parts throughout the several views, and more particularly to FIG. 1 thereof, a block diagram of the invention is presented. A laser 10 includes an optical gain or lasing medium 12, terminated by first and second facets 14 and 16 disposed perpendicularly to the optical axis 18, coupled to an optical resonant cavity 21. The first facet 14 is highly reflective while the second facet 16 is highly non-reflective. Optical energy transmitted from the lasing medium 12 thru the second facet 16 is received at the first port 20a of a four port optical coupler or beamsplitter 20. This optical energy is coupled into the optical resonant cavity 21 thru the second and third ports, 20b and 20c respectively, of said optical coupler 20. The resonant cavity 21 includes the coupler 20, a reference arm 22, and a sensing arm 24. The effective reflectivity of this resonant cavity 21 is maximized only at certain discrete resonant frequencies. Optical energy at these discrete frequencies is coupled back into the laser medium 12 through the first port 20a of the coupler 20. A laser output beam 26 is transmitted from the fourth port 20d of the optical coupler.

The resonant cavity is designed so that the resonant frequencies vary in response to a physical field 28 incident on the sensing arm 24.

Figure 2:
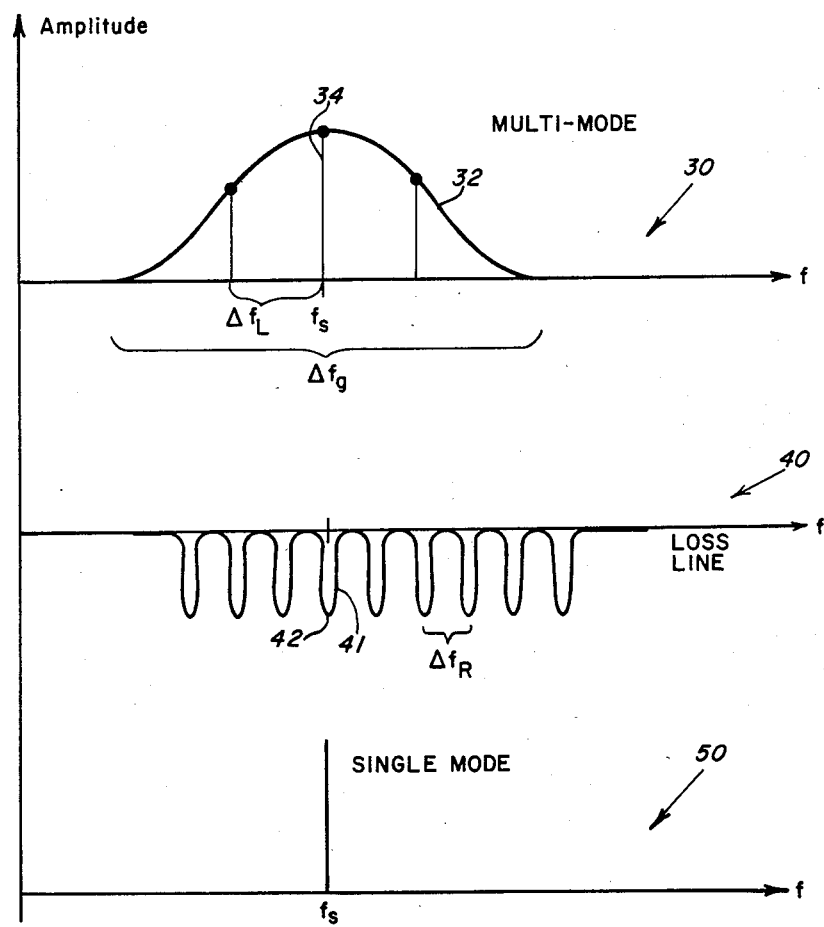
FIG. 2 is a graphical depiction of the lasing modes and resonant peaks.

The principles of operation of the invention will now be described with reference to FIGS. 2 and 3. Referring now to FIG. 2, three graphs are depicted. The first graph 30 displays the amplitude of the laser gain curve 32 of the lasing medium 12, as a function of frequency with the positions of a set of lasing modes 34 superimposed thereon. The frequency spread of the laser gain curve above threshold is designated $\Delta f_g$. These lasing modes 34 are standing waves reflected by the end facets 14 and 16 of the lasing medium 12. The spacing, $\Delta f_L$, between the lasing modes is:

$$\Delta f_L = c/2L$$

with L being the length of laser cavity and c being the speed of light. Note that there are several lasing modes 34 within the gain curve envelope. If the laser injection current is set above its threshold value for the freestanding laser medium, a number of modes 34 are excited and the laser operates in a multimode state. The multimode output beam includes a large number of frequencies, is limited in coherence length, and is characterized by high phase noise.

The second graph 40 depicts the optical loss line 41 relative to the baseline of the first graph, of the optical resonant cavity 21 as a function of frequency. This response curve 41 includes a number of peaks 42 separated by a frequency of $\Delta f_R$. The optical resonant cavity 21 replaces the second non-reflective facet 16 of a laser medium 12 and functions as a mirror of variable reflectivity. When the injection current is lowered below the threshold for oscillation in the uncoupled laser, only those modes lying within a low-loss peak 42 will be excited. As long as the length of the external cavity is not an integral multiple of the length of the laser medium, it is possible to excite a single mode only, as shown in the third graph 50. At any other frequency the photons generated in the lasing medium 12 would be transmitted by the non reflective-facet 16 and the standing wave necessary to form a lasing mode 34 would not be formed. The width of the resonant peak 41 may be adjusted so that only one lasing mode 34, at frequency $f_s$ is contained therein. A more complete description of the interaction between the lasing medium 12 and the resonant cavity 21 is presented in the article by P. W. Smith entitled "Stabilized, Single-Frequency Output from a Long Laser Cavity", Jour. of Quant. Elec., QE-1, No. 8, Nov. 1965, p. 343.

Note that the lasing medium 12 now radiates in a single-mode at frequency $f_s$ state as depicted in the third graph 50. The manner in which the lasing medium-resonant cavity combination, i.e. the laser, is modified to operate as an optical sensor will now be described with reference to FIGS. 3 and 4.

Figure 3:
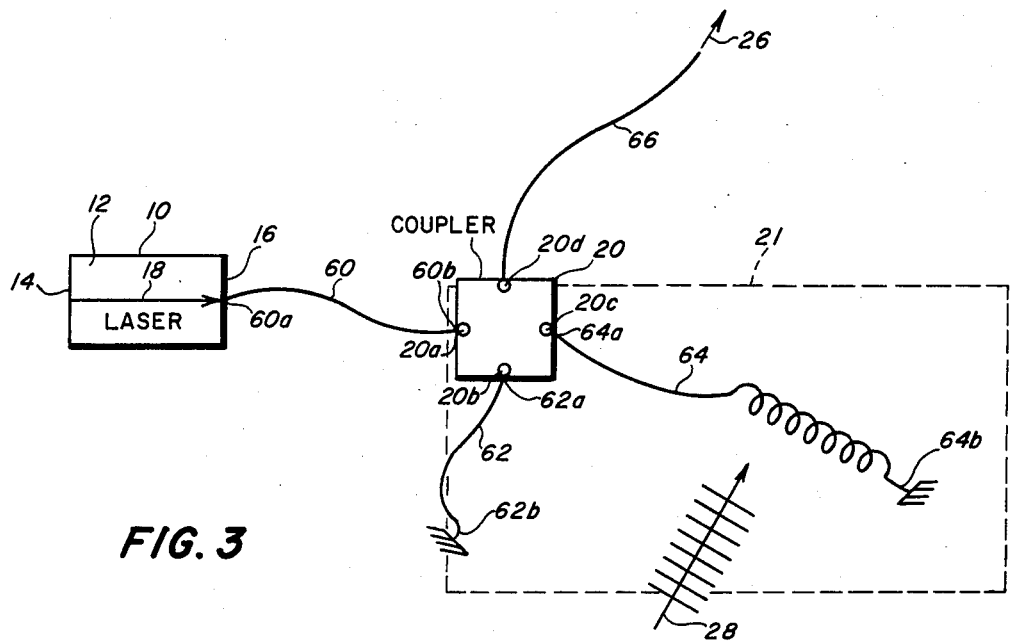
FIG. 3 is a schematic diagram of an embodiment of the invention.

Referring now to FIG. 3, a schematic diagram of an embodiment of the invention is depicted. A semiconductor diode laser 10 has a lasing medium 12 connected with a resonant cavity 21. The lasing medium 12 has two end facets 14 and 16 oriented perpendicularly to its optical axis 18. The first facet 14 is highly reflective while the second facet 16 is highly non-reflective. A first optical fiber 60, with a first end 60a optically coupled to the second facet 16 and a second end 60b optically coupled to the first port 20a of a four port optical directional coupler 20, transfers optical energy between the laser medium 12 and the coupler 20.

The optical directional coupler 20 distributes the optical energy incident on any one of the four ports between the remaining ports in predetermined ratios. These couplers are well-known in the art and not a part of the invention.

A resonant cavity 21 is formed by a reference and a sensing fiber 62 and 64 coupled to the optical coupler 20. The first end 62a of the reference fiber 62 is coupled to the second port 20b of the coupler 20 while the first end 64a of the sensing fiber 64 is coupled to the third port 20c. Both fiber 62 and 64 include a highly reflective second end 62b and 64b respectively.

The positions of and distance between the resonance peaks depicted in FIG. 2 is determined by $L = L_R + L_S$ where $L_R$ is the optical pathlength of the reference fiber 62 and $L_S$ is the optical length of the sensing fiber.

An output fiber 66 for transmitting a laser output beam 26 is optically coupled to the fourth port 20d of the optical coupler.

The sensing arm 64 is designed so that the optical length, $L_s$, will vary in response to an incident physical field 28. For example, if the sensing arm 64 is sonified by an acoustic field the index of refraction will vary with the acoustic pressure. Alternatively, the optical pathlength of a fiber coated with a magnetostrictive material will vary in response to a changing magnetic field. Thus, the positions of the resonance peaks, dependent on $L = L_R + L_S$, will vary in response to the incident physical field.

Figure 4:
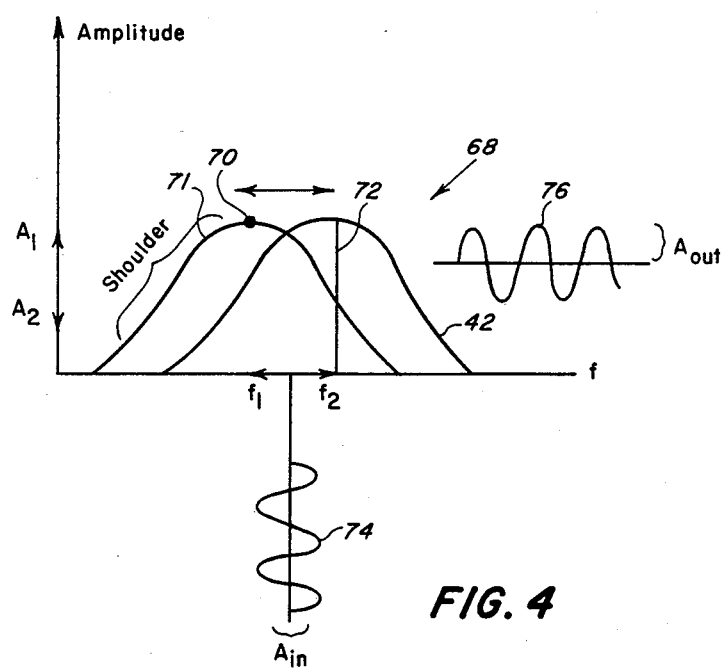
FIG. 4 is a graph of the resonant peak shifted from one frequency to another.

The manner in which the shifting of the position of the resonance peaks due to variations in the physical field modulates the operating parameters of the laser will now be described with reference to FIG. 4. Referring now to FIG. 4, a graph 68 of the amplitude of a resonant peak 42 as a function of frequency is depicted. Note that the resonant peak is characterized by a maximum 70 and a shoulder 71. A lasing mode located within the resonant peak is depicted by a vertical line 72. The amplitiude of the lasing mode is determined by the amplitude of the optical field reflected back into the lasing medium by the resonant cavity, i.e., by the amplitude of the resonant peak 42. If the position of resonant peak is shifted from $f_1$ to $f_2$ then the amplitude of the laser output beam decreases from $A_1$ to $A_2$. For a periodic position shift induced by a periodic physical field the variation of the position of the resonant peak 41 is represented by an input curve 74 with frequency $f_{in}$ and amplitude $A_{in}$. Note that the laser amplitude, represented by an output curve 76, is modulated at the frequency $f_{in}$ and has an amplitude, $A_{out}$, proportional to $A_{in}$. Stated differently, the laser output amplitude is a nearly linear function of the amplitude of the incident physical field. Thus, if the laser output power is monitored with a photodetector positioned to measure the output beam from the output fiber then $A_{out}$ and $f_{out}$ may be directly measured thereby indirectly measuring $A_{in}$ and $f_{in}$ of the physical field.

The above-described linearity is dependent on maintaining the position of the lasing mode in proper relationship with the position of the resonant peak. If the maximum 70 of the resonant peak passes over the lasing mode then an output at $2f_{in}$ would also appear. The sensor must be biased so that the lasing mode remains on the shoulder 71 of resonant curve. This biasing may be accomplished by mechanically coupling the reference arm to a piezoelectric stretcher controlled by a feedback loop. One example of a feedback loop utilizing an audio dither and phase sensitive detector is described in the above referenced article by Smith. Alternate feedback systems using difference signals or other means are well known in the art and not part of the present invention.

Instead of monitoring laser output amplitude it is possible, in some cases, to monitor the voltage drop across the diode laser to detect variations in incident physical field. This voltage drop monitoring eliminates the need for a photodetecter to monitor amplitude fluctuations thereby reducing the bulk, complexity, and expense of the sensor. The details of the efficacy of voltage monitoring for various commercially available laser diodes are set forth in the article by Mitsuhashi et al. entitled "Voltage Change Across the Self-Coupled Semiconductor Laser," IEEE Journal of Quantum Electronics, Vol. QE 17, No. 7, July 1981, p. 1216–1225.

The sensing arm of the present invention may be very large compared to the semiconductor diode thus, in effect, converting the laser into an extended sensor. The sensing fiber may be wrapped about a mandrel in Gaussian distribution pattern to achieve spatial shading. Additionally, field directionality measurements are made possible.

In the present invention the diode laser operates in a single mode state so that the device is characterized by low noise and a very narrow frequency spread thereby increasing sensitivity.

The optical coupler utilized may be bottle couplers or fused couplers which are well known.

While the embodiment described above utilizes optical fiber the device could also be fabricated in a monolithic, integrated optics embodiment. The fibers would be replaced by optical waveguide channels formed in a substrate by well-known techniques.

Since the selection of a single lasing mode is inherent in the above-described sensor the embodiment described above functions as a laser mode selector in the absence of a sensed physical field. The laser output beam is a single-mode beam which is nearly monochromatic and inherently noise free. Such beams are required in coherent communications systems.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An optical sensor sensing various kinds of physical fields, comprising:
    a semiconductor diode lasing medium, with a first and a second end facet oriented perpendicularly to the optical axis of said medium, producing coherent optical energy at a lasing frequency, said first facet being highly reflective at the lasing frequency and said second facet being highly nonreflective at the lasing frequency;
    a fiber optic coupler with first, second, third and fourth ports for distributing optical energy incident on any one of said ports in predetermined ratios between the remainder of said ports
    a first optical fiber or first optical waveguide with a first end optically coupled to the second facet of said lasing medium and with a second end optically coupled to the first port of said coupler, said first optical fiber or said first optical waveguide transmitting optical energy between said lasing medium and said coupler;
    a resonant cavity having a response curve, said cavity including said fiber optic coupler a reference optical fiber or a reference optical waveguide with a first end optically coupled to the second port of said coupler, and a second highly reflective end; said cavity also including a sensing arm optical fiber or a sensing arm optical waveguide with a first end optically coupled to said third port of said coupler and with a highly reflective second end said resonant cavity replaces said second nonreflective facet and functions as a mirror of variable reflectivity such that said resonant cavity has a plurality of resonant modes where the frequencies of said modes are determined by the optical pathlength between the highly reflective ends of said reference and sensing fibers or waveguides and by the lasing frequency, and where the optical energy of said resonant modes is reflected back to said optical gain medium through said optical coupler and said first fiber or said first waveguide thereby exciting those lasing modes with frequencies within the peaks of the response curve of said resonant cavity; and means for varying the optical pathlength of said sensing optical fiber or said sensing optical waveguide in response to various kinds of incident physical fields of large spatial extent to shift the frequencies of said resonant modes.

2. The optical sensor recited in claim 1 wherein:
    a dielectric layer is disposed on said second facet of said semiconductor diode for minimizing the reflectivity of said second facet.

3. The optical sensor recited in claim 1 wherein:
    said means for varying the optical pathlength of said sensing optical fiber or sensing optical waveguide includes means for varying the index of refraction of said sensing optical fiber in response to said external field.

4. The apparatus recited in claim 1 further including:
    an output fiber or output waveguide, with an first end optically coupled to the fourth port of said optical coupler, for transmitting a laser output beam from said coupler; and
    a photodetector, positioned to receive the output beam transmitted from an output end of said output fiber or said output waveguide, for measuring intensity of said laser output beam.

5. The apparatus recited in claim 4 further including:
    means for maintaining a substantially linear relationship between variations in the intensity of the output beam and the amplitude of said incident physical field.

6. The apparatus recited in claim 1 further including:
    means for measuring the voltage drop across said diode.

7. The apparatus recited in claim 6 further including:
    means for maintaining a substantially linear relationship between variations in the voltage drop across said diode lasing medium and the amplitude of said incident physical field.

8. A method for sensing various kinds of external fields, such as acoustic fields or magnetic fields, including the steps of:
generating a coherent optical field in the lasing medium of a laser, said lasing medium having a plurality of lasing modes;
coupling said optical output from said lasing medium into an optical resonant cavity having a response curve with a plurality of peaks;
varying the frequency and phase of said resonant modes in response to a physical field of large spatial extent incident on a sensing arm in said resonant;
reflecting the optical of said resonant cavity back into said lasing medium to excite only those lasing modes having frequencies within the peaks of the response curves of said resonant cavity.

9. The method recited in claim 8 wherein:
said step of measuring variations in laser operating parameters includes the step of measuring the intensity of the optical field reflected away from said lasing medium.

10. The method recited in claim 8 wherein:
said step of measuring variations in the operating parameters of said lasing medium includes the step of measuring the voltage drop across said lasing medium.

* * * * *